United States Patent [19]

Van Wicklin, Jr.

[11] 4,386,538
[45] Jun. 7, 1983

[54] ENERGY ABSORBING STEERING WHEEL

[75] Inventor: Warren A. Van Wicklin, Jr., Dearborn, Mich.

[73] Assignee: Ford Motor Company, Dearborn, Mich.

[21] Appl. No.: 304,745

[22] Filed: Sep. 23, 1981

Related U.S. Application Data

[63] Continuation of Ser. No. 116,378, Jan. 29, 1980, abandoned.

[51] Int. Cl.³ .............................................. G05G 1/10
[52] U.S. Cl. ...................................................... 74/552
[58] Field of Search .......................................... 74/552

[56] References Cited

U.S. PATENT DOCUMENTS

| | | | |
|---|---|---|---|
| 3,016,764 | 1/1962 | Fredericks et al. | 74/552 |
| 3,167,974 | 2/1965 | Wilfert | 74/552 |
| 3,321,996 | 5/1967 | Cardinale | 74/552 |
| 3,394,615 | 7/1968 | Brueder | 74/552 |
| 3,802,291 | 4/1974 | Young, Jr. et al. | 74/552 |
| 3,938,404 | 2/1976 | Murase et al. | 74/552 |
| 4,010,658 | 3/1977 | Muller et al. | 74/552 |

FOREIGN PATENT DOCUMENTS 1373497  11/1974  United Kingdom .................. 74/552

*Primary Examiner*—Kenneth Dorner
*Attorney, Agent, or Firm*—John J. Roethel; Daniel M. Stock; Clifford L. Sadler

[57] ABSTRACT

A steering wheel mounted on a hub. The steering wheel is molded of a high impact grade nylon and comprises an integral rim, spokes and a thin wall energy absorbing sleeve. The rim is disposed in coaxial relationship to and axially spaced from the hub.

The energy absorbing sleeve when viewed in plan view has a substantially rectangular configuration of decreasing size from its upper end downwardly toward the hub. The walls of the sleeve have a generally ogival configuration from top to bottom. The construction and arrangement is such that the energy absorbing sleeve produces a large amount of crush at relatively constant load for obtaining a high degree of energy absorption.

2 Claims, 6 Drawing Figures

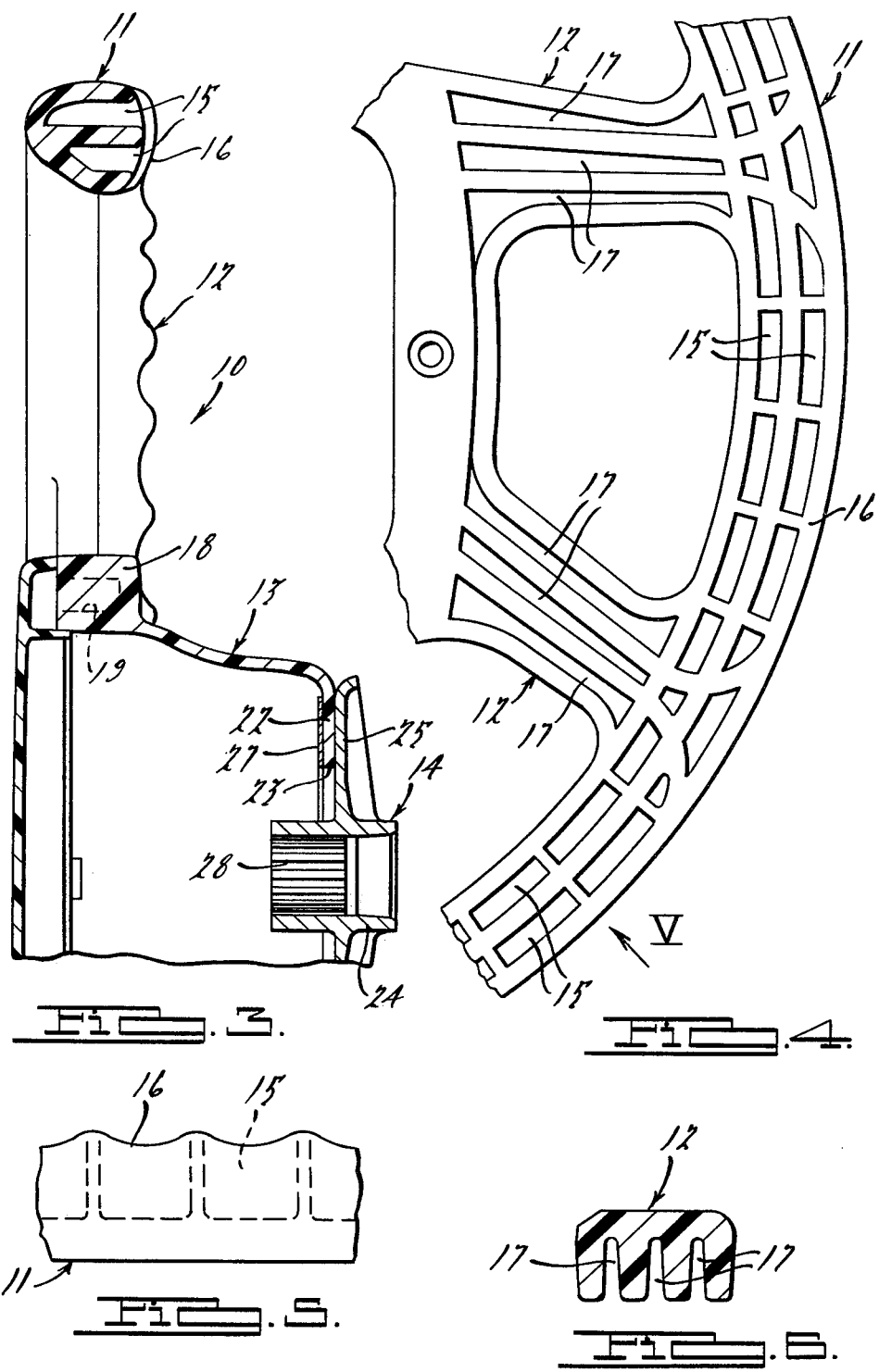

ENERGY ABSORBING STEERING WHEEL

This is a continuation of application Ser. No. 116,378, filed Jan. 29, 1980, now abandoned.

BACKGROUND OF THE INVENTION

The present invention relates to steering wheels for motor vehicles, and more particularly, to impact energy absorbing steering wheels.

U.S. Pat. No. 3,016,764 issued Jan. 16, 1962 to R. H. Fredericks et al. for a "Safety Steering Wheel" discloses a two-stage collapsible steering wheel comprising a flexible rim steering wheel having a steel armature that provides the necessary torsional stiffness for steering the vehicle while permitting axial displacement of the rim under relatively low impact load conditions. The armature is supported on a central energy absorbing structure constructed and arranged to progressively collapse under load to absorb any impact energy over and above that causing axial displacement of the rim.

Since the development of the Fredericks et al steering wheel assembly, attempts have been made to substitute plastic materials for the all steel construction. The primary advantage of the use of plastic materials is the weight saving that may be achieved, a factor that is becoming more critical as the demand grows in the marketplace for more fuel efficient vehicles. Prior art patents documenting the evolution of the all metal steering wheel assembly toward an all plastic steering wheel include U.S. Pat. Nos. 3,167,974 issued Feb. 2, 1965 to K. Wilfert for a "Steering Wheel", 3,802,291 issued Apr. 9, 1974 to F. E. Young, Jr. et al. for a "Soft Steering Wheel Rim", 3,938,404 issued Feb. 17, 1976 to G. Murase et al. for an "Energy Absorbing Steering Assembly" and 4,010,658 issued on Mar. 8, 1977 to G. H. Muller et al. for a "Steering Wheel Having a Flexible Rim".

All of these prior art patents disclose composite structures, i.e., steering wheel assemblies utilizing steel and plastic materials. The present invention provides a steering wheel assembly in which the only major metal component is the metal hub for mounting the steering wheel on the vehicle steering shaft.

SUMMARY OF THE INVENTION

In the preferred embodiment of the present invention, the energy absorbing steering wheel is mounted on a hub. The steering wheel is molded of a high impact grade of nylon and comprises an integral rim, spokes and a thin wall energy absorbing sleeve. The energy absorbing sleeve when observed in the plan view appears to have a substantially rectangular configuration of decreasing size from its upper end downwardly toward the hub. The walls of the sleeve are convoluted, the convolutions preferably being substantially ogival from top to bottom. This construction provides an energy absorbing sleeve that is capable of producing a large amount of crush at relatively constant load for obtaining a high degree of energy absorption.

DESCRIPTION OF THE DRAWINGS

Other objects, advantages and features of the present invention will become more apparent as the description proceeds, reference being had to the accompanying drawings, wherein:

FIG. 3 is an enlarged sectional view taken substantially on the line 3—3 of FIG. 1;

FIG. 4 is a fragmentary bottom view of the steering wheel assembly;

FIG. 5 is a view looking in the direction of the arrow 5 of FIG. 4; and

FIG. 6 is a section view taken substantially on the line 6—6 of FIG. 1 looking in the direction of the arrows.

DETAILED DESCRIPTION OF THE INVENTION

Figure 1:
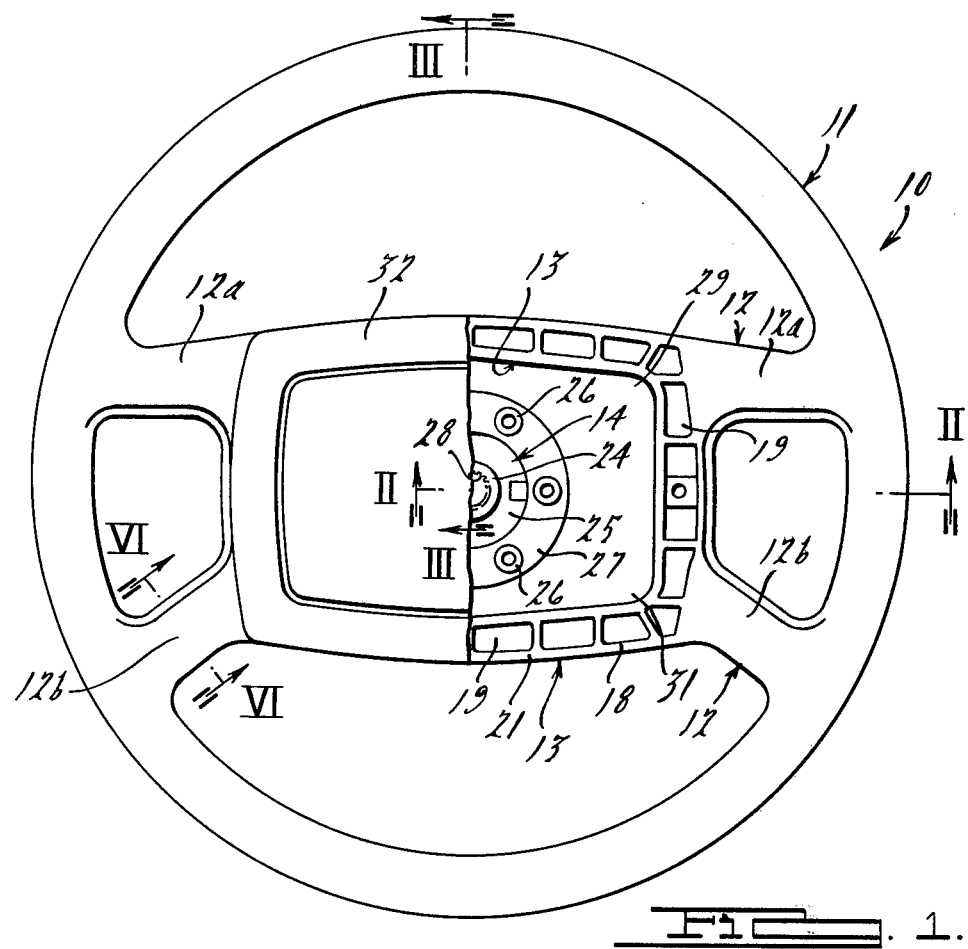
FIG. 1 is a plan view of a steering wheel assembly incorporating the principles of the present invention.
Figure 2:
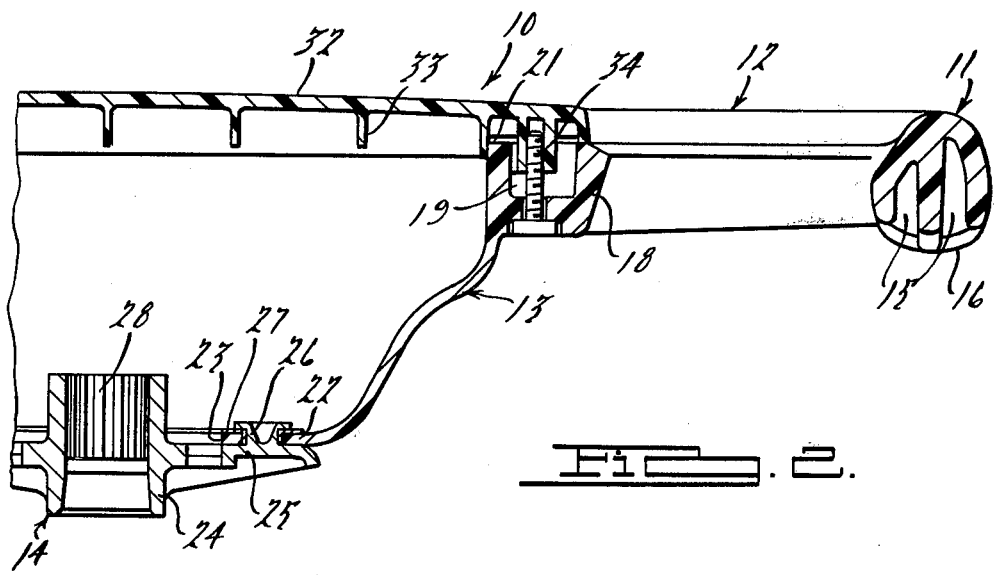
FIG. 2 is an enlarged sectional view taken substantially on the line 2—2 of FIG. 1.

Referring now to the drawings, there is shown a steering wheel, generally designated 10, embodying the present invention. The steering wheel comprises basically a rim 11, spokes 12, and an energy absorbing sleeve 13, all of which are supported on a hub 14. The rim 11, the spokes 12 and the energy absorbing sleeve 13 are a one piece structure homogeneously molded of a high impact grade nylon. There is no metal involved other than in the hub 14.

As in a conventional steering wheel the rim 11 is disposed in a coaxial relationship to the hub 14 and the plane of the rim is axially displaced from the hub.

The rim 11 has small cored-out pockets 15 on its underside 16, see FIG. 4. The cored-out pockets 15 have a dual function. First, they reduce the weight of the rim and, therefore, that of the steering wheel. Second, the cored-out pockets control the rigidity of the rim. In an energy absorbing steering wheel it is highly desirable for the rim structure to have a substantial amount of flexibility under high chest impact loads during frontal vehicle crashes to provide full chest contact. Yet the rim structure must have sufficient rigidity for the steering function and to act as a grab bar.

As seen in FIGS. 4 and 6, the spokes 12 also are cored-out. The cored-out pockets 17 extend longitudinally of the spokes and function to reduce the weight of the steering wheel and to control the rigidity of the spoke and rim structure.

The energy absorbing sleeve 13, when viewed in the plan view, as in FIG. 1, has a substantially rectangular configuration. The sleeve 13 is of a diminishing size from top to bottom. That is, if a plurality of planes were axially spaced in parallel relationship from top to bottom of the sleeve, the area of the rectangle in each plane would be smaller than the area of the plane above it. The sleeve 13 is of a thin wall construction with each of the four walls having an ogival configuration from top to bottom. At its upper end, the sleeve 13 is outwardly reinforced by a thickened rectangular annulus 18 of substantially square cross section to which the spokes 12 are integrally cantilevered. The annulus 18 also is provided with a plurality of cored-out weight reduction pockets 19 extending inwardly from the upper face 21 thereof.

The sleeve 13 sidewalls terminate in an inwardly turned flat base portion 22 that is centrally apertured at 23 to receive the hub 14. The hub 14 has an impact extruded cylindrical body 24 having a radially extending annular flange 25. The flange 25 has a circle of integral aluminum semi-tubular rivets 26. The rivets 26 project through a matching set of holes in the shell base 22 and a steel plate or stamping 27 and are spun over to clamp the plastic material between the flange 25 and the plate 27. The steel plate 27 serves to increase the contact area to reduce stress concentration particularly of the rivets 26 with the plastic of the sleeve base 22.

The upper half of hub 14 is internally splined at 28 to be received on the splined upper end of a vehicle steering shaft (not shown).

The steering wheel 10 preferably has four spokes 12 which, in the normal centered position of the steering wheel as shown in FIG. 1, have a configuration in which the upper two spokes 12a extend outwardly to the rim 11 in alignment with each other from the upper corner portions 29 of the short sides of the rectangular annulus 18 of the sleeve 13. The lower two spokes 12b extend from the lower corner portions 31 of the annulus 18 in an angularly downwardly direction. The particular arrangement of spokes on each side of the steering wheel is conventional and provides substantial increase in rim stiffness while allowing the use of spokes that permit low deflection rates in bending out of the plane of the unstressed steering wheel. A low deflection rate of the spokes is desirable to protect the vehicle operator in the event of a frontal collision involving the vehicle. That is, when the anterior surface of the driver's abdominal region strikes the steering wheel rim, the spokes allow the rim to deflect without excessive reaction force until the thoracic region contacts the large surface area of a hub cover 32. The force applied to the hub cover 32, if sufficiently great, will be transmitted to and cause collapse of the energy absorbing sleeve 13.

The hub cover 32 is molded in a substantially rectangular configuration from a suitable color impregnable plastic. The cover 32 is hollow having suitable cross ribs 33 to provide the necessary rigidity while minimizing the weight.

The cover 32 is held in place by suitable self-tapping screws 34 around its perimeter.

A high impact grade of nylon was chosen for the substantially all plastic steering wheel because it possesses physical properties that make it unnecessary to cover or coat the nylon. In the manufacture of plastic steering wheels from polycarbonate materials, a second molding operation is required since the polycarbonate preferably must be coated by a polyvinylchloride plastic (PVC). Additional advantages derived from the nylon construction compared to a composite polycarbonate/PVC is substantial weight reduction as a result of (1) lower specific gravity of nylon, and (2) elimination of the plastic filling the cored-out pockets of the rim and spokes which become PVC filled in a second molding operation. Since the nylon is not covered with a nonstructural material, especially PVC which adds no rigidity to the structure, the nylon can be distributed in the rim and spoke sections to obtain increased section modulus. This beneficial effect tends to offset the lower flexural modulus of nylon compared to a material such as a polycarbonate.

It is to be understood this invention is not limited to the exact construction illustrated and described above, but that various changes and modifications may be made without departing from the spirit and scope of the invention as defined in the appended claims.

I claim:

1. An energy absorbing steering wheel mounted on a hub for turning movement about an axis of rotation;

the steering wheel having a rim coaxially mounted through a plurality of spokes on one end of an axially extending energy absorbing sleeve;

the spokes extending outwardly from the one end of the sleeve to the rim;

the other end of the sleeve being coupled to the hub;

and the rim, spokes and sleeve being a one-piece structure homogeneously molded of a high impact elastomeric material;

the rim and the spokes having circumferentially and longitudinally extending rib configurations, respectively, on their undersides to provide weight reduction and a desideratum of flexibility in the direction of the axis of rotation of the steering wheel;

the energy absorbing sleeve at the level of its connection to the spokes having a substantially rectangular configuration that is maintained through any cross-section plane taken normal to the axis of rotation for the length of the sleeve to a level contiguous to the hub;

the hub having a width defined in planes normal to the axis of rotation that does not exceed the width of the sleeve in any radial direction from the axis of rotation;

the sleeve having thin side walls each of which has a substantially ogival configuration that slopes inwardly toward the axis of rotation from the one end to the other end of the sleeve whereby the cross-sectional areas of the sleeve decrease from the one end of the sleeve toward the other;

the energy absorbing sleeve upon axial forces being applied thereto permitting a large amount of crush at relatively constant load to provide a high degree of energy absorption.

2. A steering wheel according to claim 1, in which:

the energy absorbing sleeve has at its upper end a rectangular annulus to which the spokes are cantilevered;

the rectangular annulus having side walls, the cross-sectional width and depth of which are substantially greater than the thickness of said thin side walls of the sleeve.

* * * * *